Oct. 21, 1969    P. T. CHU ET AL    3,473,542
IN SITU PIPELINE HEAT GENERATION
Filed Sept. 8, 1967
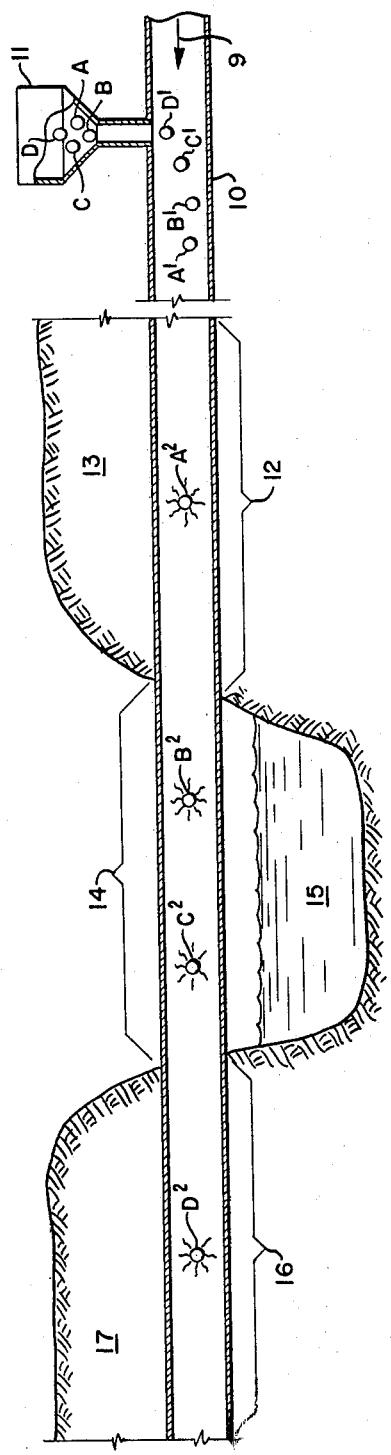
INVENTORS:
PAUL T. CHU
CLARKE L. COLDREN
BY: Louis J. Bovasso
THEIR ATTORNEY United States Patent Office 3,473,542
Patented Oct. 21, 1969

3,473,542
IN SITU PIPELINE HEAT GENERATION
Paul T. Chu, Peekskill, N.Y., and Clarke L. Coldren, Westport, Conn., assignors to Shell Oil Company, New York, N.Y., a corporation of Delaware
Filed Sept. 8, 1967, Ser. No. 666,429
Int. Cl. F17d 1/18; F24j 1/00
U.S. Cl. 137—13                                8 Claims

ABSTRACT OF THE DISCLOSURE

The viscosity of a fluid flow stream in a pipeline is altered by treating a particulate material that is an agent in a heat exchanging reaction with the flow stream fluid with a soluble coating material thereby forming a particle. A plurality of such particles having coatings of varying predetermined solubilities are placed in the flow stream and the chemical combination of the coated material of the particles with the fluid is delayed so as to produce the heat exchanging reaction by the insulating effect of the coating material of the particles. The particles are carried through the pipeline by the flow stream to a predetermined location where the coating material of the particles is dissolved at the varying predetermined rates by the flow stream fluid and the particulate material is exposed to the flow stream fluid by the dissolution of the coating material of the particles at the predetermined location whereby the heat exchanging reaction is initiated.

BACKGROUND OF THE INVENTION

Field of the invention

This invention relates to a method for chemically heating or cooling fluids flowing in pipelines, and, more particularly, to viscosity control through in situ thermal energy exchange by chemically reacting a portion of the fluid flowing in a pipeline with a selected reactant.

DESCRIPTION OF THE PRIOR ART

Vast networks of pipelines, particularly in the southwestern portion of the United States, provide a means for the transmission of petroleum crudes from production areas to refineries or transportation facilities. Similar pipelines also crisscross the other portions of the United States carrying, in addition to petroleum crudes, many other fluids, and in some cases fluid-solid mixtures.

Whether pipelines are used for the transmission of petroleum crudes, other fluids, or fluid-solid mixtures, a major expense in the transmission thereof is the pumping cost. From the following equation it can be seen that pumping cost in laminar flow will be proportional to the viscosity of the fluid.

$$\Delta P = 32LVv'/gD^2$$

In the Hagen-Poiseuille equation (above)

$\Delta P$ = pressure drop in lbs./sq. ft.
$V$ = velocity in ft./sec.
$L$ = length of pipe in ft.
$v'$ = viscosity in lbs./ft./sec.
$g$ = acceleration of gravity in ft./sec./sec.
$D$ = diameter (inside) in ft.

From a perusal of the above equation it can be seen that the viscosity $v'$ of the fluid being pumped through the pipeline plays a large role in determining the actual pumping cost. For example, if the viscosity doubles it will require twice the work to maintain a constant throughput. Likewise, it can also be shown that in turbulent flow, the viscosity of the fluid still plays an important role in determining pumping costs.

Since the viscosity of a given fluid is dependent upon the temperature of the fluid, even seasonal changes of temperature at the situs of a pipeline can considerably alter the pumping cost. For example, seasonal temperature change of approximately 25° C. can change the viscosity of naphthalene from 3.3 centipoises at 25° C. to 7.5 centipoises at 0° C., resulting in a more than double increase in the pumping cost of naphthalene at the latter temperature.

In addition, there are some petroleum crudes in the United States, such as certain crudes in the state of Mississippi, which have extremely high viscoisty and cannot be moved by pipelines without heating to lessen their viscosity. For example, Baxterville oil has a viscosity of 17,400 Sabolt Universal seconds (SUS) at 60° F. and a gravity of 16.4 API°, being almost a plastic semi-solid. In order to pump such a viscous crude through a large diameter pipeline, a minimum line temperature of 80° F. must be maintained, and pressures as high as 1,000 p.s.i. may be required to achieve useful flow.

One technique to the transmission of viscous crudes, such as described above, is the use of oil heating equipment at pumping stations. Live steam boilers cooperating with heat exchangers can be used to provide the necessary heat to lower the viscosity of these crudes and make crudes like the Baxterville crudes pumpable. Of course, heating to improve pumpability is not limited to the highly viscous crudes above, and such boilers can be used to lower the viscosity of the less viscous crudes to achieve a reduction in pumping costs. Boilers employed in such techniques are usually fueled by natural gas or oil or a combination thereof; and when working with viscous crudes standby fuel supplies are a must since a failure of any boiler can be disastrous, allowing the crudes to freeze in the pipeline. A notable example of a steam-heated pipeline is the 152-mile pipeline from Eucutta, Miss., to Mobile, Ala., discussed in World Oil, March 1952, pp. 214–216, in an article entitled, "Steam-Heated Pipeline." The article describes a pipeline using 150 horsepower boilers, spaced at 9-mile intervals to prevent the crude from freezing in the pipeline.

While such oil-heating equipment at pumping stations can provide the necesary heat to lower pumping cost and/or improve the pumpability of highly viscous fluids, they are not very efficient since the heat in the combustion unit cannot be fully transferred to the pipeline fluid. Furthermore, boiler and heat exchange equipment is often expensive, and the costs of operation and maintenance can be considerable, often requiring a licensed operator. Further, the space between two heating units along the pipeline has to be large to minimize the number of units required. Thus, it is necessary that the crude be raised to a rather high temperature at each station in order to retain sufficient heat to reach the next heating unit. Of course, these high temperatures provide a large temperature differential ($\Delta T$) between the pipeline and the local surroundings, resulting in high heat loss and extreme inefficiency.

SUMMARY OF THE INVENTION

It is an object of the present invention to provide a method for heating fluids in pipelines without heat exchange equipment, such as boilers and cooperating heat exchangers.

It is also an object of the present invention to provide a method whereby the temperature of a fluid in a pipeline can be maintained simply, economically and automatically.

Another object of the present invention is to optimize the operational efficiency of a pipeline carrying fluids having a relatively wide viscosity variance over a relatively narrow temperature range by an in situ heat exchange process resulting from the chemical reaction of a portion of the fluid flowing therethrough with a selected reactant. The reaction is controlled by coating particulate agents of the reaction with predetermined thicknesses of a compound that is soluble in the pipeline fluid to delay the reaction until the agent reaches a selected point along the pipeline length.

BRIEF DESCRIPTION OF THE DRAWING

The drawing figure is a schematic representation of a pipeline that is heated in accordance with the method of the invention.

DESCRIPTION OF THE PREFERRED EMBODIMENT

One aspect of the present invention broadly encompasses a method for heat generation within pipelines having fluids that are exothermally reactive by effecting an exothermal chemical reaction of a portion of said pipeline fluid with a selected reactant as the two flow together through the pipeline. In this manner it is possible to add heat directly to the unreacted pipeline fluid without the necessity of heat exchange equipment. More specifically, the invention relates to the method of preparing a selected reactant for a controlled reaction time and place which will cause an insitu heat generation in a particular selected section of the pipeline. This heat generation will lower the viscosity and results in improved pumpability. The improved pumpability occurs because the pressure drop for movement of the fluid through the pipeline is proportional to its viscosity and the viscosity is inversely proportional to its temperature. Thus, an increase in temperature intrinsically reduces pumping costs.

It is known that when two or more compounds combine to form a third compound, thermal energy is either released or absorbed from the surrounding environment depending on the nature of the reaction. In the former case, that is, when thermal energy is released as a result of the chemical reaction, the phenomenon is known in the art as exothermal reaction. In the latter case, i.e., when thermal energy is absorbed from the surrounding environment, the reaction is known as an endothermal one. The subject energy exchange is defined to be a change in enthalpy from the level present in the unreacted compounds and that of the compound resulting from the reaction. In an exothermal reaction, therefore, the excitation state between the composite elemental molecules of the resultant compound is at a net lower level than was the net state of excitation beween said molecules in their respective unreacted compound combinations. This being true and in conformity with the first law of thermodynamics, there must be a release of energy from the system which passes into the surrounding environment in the form of heat.

The mechanics of an endothermal reaction are just the opposite of those of the exothermal reaction explained above.

It has been discovered that these principles may be applied to the art of fluid pipelining by reacting discrete portions of the pipeline fluid with selected reactants to replenish the heat within the pipeline system lost to the environment surrounding the pipeline by natural convection. Conversely, undesirable heat influx into the pipeline system may be similarly absorbed.

Of course, the flow stream of the pipeline conducted fluid will be contaminated by the presence of the resulting compound, but it has been found the amount of such contamination is proportionally negligible in many cases for the amounts of heat that need to be handled. Furthermore, if subsequent purification is necessary, it nevertheless may oftentimes be conducted at an economic benefit as compared to mechanical pipeline heating means.

It is obvious, however, that a reactant intended for such purposes may not be merely dumped into the fluid flow stream for immediate reaction therewith at any convenient location for two reasons. First, a "hot spot" or "cold spot" in the flow stream would be generated at a point where it is not necessarily desirable. Secondly, a region of greater heat differential between the flow stream temperature and the temperature of the surrounding environment would be created, thereby increasing the driving force for undesirable heat transfer between said flow stream and said surrounding environment.

It is apparent, therefore, if chemical pipeline heating or cooling is to be practicable, a means must be devised to place the reactant compound in the fluid flow stream at some convenient location such as a pumping station and delay the reaction thereof until said flow stream carries the reactant downstream a predetermined distance to a location where the heat to be generated is needed and then only so much as is necessary. In a crude oil pipeline, for example, there may be a regular or evenly plotted temperature gradient over a major length of the line between pumping stations in which the heat losses are relatively small per unit length due to the fact that the pipeline is buried underground and insulated thereby. At one location in this span, however, such as where the pipeline crosses a large river or tributary, the line may be exposed to the atmosphere in a cold climate. Here, the heat losses would be unreasonably large and result in the congealing and increased viscosity of the flow stream. A similarly opposite condition may be imagined for a pipeline carrying liquid petroleum gas in which it is desired to keep the temperature low.

In applications as outlined above, it is necessary that the chemical reaction to handle the heat ingestion must be carried on continuously throughout the pipeline span involved with an increase in the reaction rate in the span of disproportionately higher heat transfer. With this criterion in mind, attention is directed to the device of the pharmaceutical drug industry of coating drugs with a soluble compound to delay the reaction of the administered drug until the soluble coating has been dissolved away. Combining these two concepts brings one to the conclusion that a particulate form of a compound, which, when combined with a pipeline conducted flow stream fluid, reacts in a manner to produce the desirable heat transfer rate, may have that reaction delayed until the particular compound particle is carried downstream a predetermined distance by a flow stream of known flow velocity by coating the compound particle with a layer of predetermined thickness of soluble material having a known rate of diffusion into the flow stream fluid under the prevailing conditions. For example, in a crude oil pipeline, particles of certain oxidizing or oxygen carrying chemicals can be coated with a layer of paraffin of prescribed thickness and carried downstream by pipeline conducted fluid. During the span of their passage, the coatings of the particulate matter are gradually dissolved into the crude oil and ultimately, at a distance from the point of introduction, the chemicals are exposed to the crude oil. A combustion reaction is thus set up to generate necessary heat for elevating the oil temperature, thereby reducing the viscosity.

Applying the above principles to a specific pipeline span, such as the one described, it would only be necessary to charge the pipeline flow stream with a coated particulate reactant at a rate proportionate to the total heat transfer rate of the span in question. The distribution of chemically generated heat may be controlled by analyzing the entire subject pipe span as a series of finite incremental lengths so that an appropriate proportion of a given reactant charge will have its coating dissolved away upon reaching a predetermined increment span. In other words, various thicknesses of soluble coating are applied to respective particles of reactant so as to delay the chemical combination of said respective particles with the flow stream fluid, crude oil in our example, until it reaches the appropriate pipeline increment. In this way, heat may be generated simply and uniformly throughout the length of the pipeline at the specific locations where it is most needed and only in the quantities required.

The above example of the invention is schematically represented by the drawing wherein a mechanical device such as a hopper 11 is provided to inject the reaction agent particles A, B, C and D into the flow stream 9 of a pipeline 10. The particles A, B, C and D are provided with soluble coatings of selectively different thicknesses, A, for example, having the least thickness of the four, B and C having similar or the same coating thickness but greater than A and D having the greater coating thickness. The particles enter the flow stream 9 as A', B', C' and D' with no reactive effect except that the respective soluble coatings immediately begin to dissolve at a uniform rate. The route of the pipeline 10 may first include a span 12 covered by earth 13 in which the heat losses are relatively small. At a selected point along the span 12, the coating on particle A is completely dissolved away, allowing the particle to react with the flow stream as represented by $A^2$. Particles B, C and D, still having some coating compound remaining, continue downstream.

Along the span 14 where the pipeline crosses a river 15 and is exposed to the atmosphere, the heat losses are considerable as compared to the earth-covered span 12. Here a greater amount of heat needs to be released to keep the flowstream at a temperature level compatible with the desired viscosity. For this reason, half of the total initial chemical charge in the flow stream is prepared to react in the span 14 as represented by particles $B^2$ and $C^2$.

With only a second underground span 16 covered by earth 17 remaining, the remaining particle D is carried downstream to a selected position within said span 16 whereupon the coating for D is dissolved away and the reaction begins as represented by $D^2$.

For convenience of illustration, the invention is described in terms of a system consisting of a coated particulate material directly reactive with the pipeline conducted fluid. The heat of reaction from this system is utilized to regulate the fluid temperature. The same object may be achieved with combinations other than above mentioned. For example, (1) When the pipeline fluid is not combustible, or when it is not desirable to react a portion of pipeline fluid for the purpose of heat generation, heating (or cooling) of pipeline fluids can be achieved by introducing a mixture of particulate material consisting of two (or more) chemical reactants such that when the coating is dissolved in the pipeline fluid at the prescribed time (or distance) after introduction, these two reactants would undergo an exothermic reaction (endothermic, if for cooling). The heat thus generated would maintain the pipeline fluid temperature level. Again, in this case, the time at which the reaction takes place depends on the thickness of the coating; (2) When the reactive system (pipeline fluid and added chemical) calls for a suitable catalyst to promote the desired reaction, the catalyst may be coated with a soluble film which would expose the catalyst particles at the desired place of the pipeline span. Timed heat generation is thus accomplished; and (3) The same result can be achieved if the added chemical is coated instead of the catalyst. This scheme is particularly useful when the pipeline wall material is utilized as the catalyst necessary to promote the reaction. In other words, the material of the bore wall of pipeline 10 may constitute the catalyst in the aforementioned reaction.

From the foregoing it can be appreciated that the broad concept of this invention offers considerable advantages over the use of such fixed installation devices such as boilers and the like to heat the fluids flowing through pipelines.

We claim:
1. A method of altering the viscosity of a fluid flow stream in a pipeline comprising the steps of:
   treating a particulate material that is an agent in a heat exchanging reaction with said flow stream fluid with a soluble coating thereby forming a particle;
   placing a plurality of said particles having soluble coatings of varying predetermined solubilities in said flow stream;
   delaying the chemical combination of said particulate material with said flow stream fluid to produce said heat exchanging reaction by the insulating effect of said coatings;
   carrying said particles through said pipeline by said flow stream to a predetermined location within said pipeline;
   dissolving said coatings at said varying predetermined rates by said flow stream fluid; and
   exposing said particulate material to said flow stream fluid by the dissolution of said coatings at said predetermined location whereby said heat exchanging reaction is initiated.
2. A method as described by claim 1 wherein said heat exchanging reaction is an exothermal reaction.
3. A method as described by claim 1 wherein said heat exchanging reaction is an endothermal reaction.
4. A method as described by claim 1 wherein said particulate material reacts directly with said flow stream fluid when combined therewith.
5. A method as described by claim 1 wherein said reaction is a catalytic reaction.
6. A method as described by claim 5 wherein said coated particulate material is a reactant in said catalytic reaction.
7. A method as described by claim 6 comprising the additional step of placing a particulate catalyst in said flow stream in the presence of said particulate reactant.
8. A method as described by claim 6 wherein the pipeline bore wall material constitutes the catalyst in said reaction.

References Cited

UNITED STATES PATENTS

| | | | |
|---|---|---|---|
| 1,679,432 | 8/1928 | Lyon | 44—3 |
| 1,841,776 | 1/1932 | Aronson | 62—4 XR |
| 1,928,226 | 9/1933 | Ladd | 44—3 XR |
| 2,010,800 | 8/1935 | Adams | 44—3 XR |
| 2,795,560 | 6/1957 | Williams | 137—268 XR |
| 2,824,611 | 2/1958 | Burch | 166—57 |

ROBERT G. NILSON, Primary Examiner

U.S. Cl. X.R.

44—3; 62—4; 122—21; 126—263; 137—268, 334